United States Patent [19]
Serrano et al.

[11] Patent Number: 5,638,421
[45] Date of Patent: Jun. 10, 1997

[54] APPARATUS AND METHOD FOR INCOMING CALL DETECTION AND ALARM CIRCUITRY FOR CELLULAR TELEPHONES

[75] Inventors: Arthur Serrano, West Hills; Asher Avitan, Granada Hills, both of Calif.

[73] Assignee: Ora Electronics, Inc., Chatsworth, Calif.

[21] Appl. No.: 506,543

[22] Filed: Jul. 25, 1995

[51] Int. Cl.$^6$ .............................. H04M 1/24; H04M 3/22; H04M 1/00; H04M 9/00
[52] U.S. Cl. .............................. 379/34; 379/1; 379/33; 379/372; 379/374; 379/376; 379/387; 379/396; 455/127; 455/343
[58] Field of Search ............................ 379/1, 33, 34, 379/58–61, 63, 387, 396, 372, 374, 376; 455/33.1, 547, 89, 90, 127, 343

[56] References Cited

U.S. PATENT DOCUMENTS

| | | | |
|---|---|---|---|
| 4,677,656 | 6/1987 | Burke | 379/63 |
| 4,873,712 | 10/1989 | Porco | 379/58 |
| 4,951,311 | 8/1990 | Sterr | 379/396 |
| 5,025,467 | 6/1991 | Wheller | 379/60 |
| 5,224,152 | 6/1993 | Harte | 379/59 |
| 5,243,640 | 9/1993 | Hadley | 379/58 |
| 5,278,995 | 1/1994 | Hwang | 455/343 |
| 5,404,391 | 4/1995 | Wavroch | 379/59 |

*Primary Examiner*—Curtis Kuntz
*Assistant Examiner*—Vijay Shankar
*Attorney, Agent, or Firm*—Matthew F. Jodziewicz

[57] ABSTRACT

An apparatus and method for indicating an incoming call that generates a voltage signal with a value representative of the current drawn by operation of the device. A circuit monitors the voltage signal and generates a waiting for call state signal whenever the value of the voltage signal decreases from a first selected higher value to a first selected lower value for a first preselected period of time. An RF detection circuit monitors the status of the device's transmitter and generates a transmitter active status signal whenever RF appears for a selected period of time. An incoming call detection circuit generates an alarm start signal whenever the waiting for call state and transmitter active status signals are present and either the voltage signal increases from a second selected lower value to a second selected higher value and remains at or above the second selected higher value for a second preselected period of time, or the current goes from a lower preselected current value to a higher preselected current value and remains at or above the higher current value for a third preselected period of time. An alarm, operative upon receipt of the alarm start signal, indicates an incoming call to a user. A circuit monitors the battery voltage and disables the apparatus whenever the battery voltage drops below a preselected cutoff value to avoid damage to the battery.

29 Claims, 5 Drawing Sheets

APPARATUS AND METHOD FOR INCOMING CALL DETECTION AND ALARM CIRCUITRY FOR CELLULAR TELEPHONES

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to wireless network access devices, such as cellular telephones, and methods of alerting a user to an incoming call, and, in particular, in circuitry for monitoring a battery pack that alerts a user to an incoming call on the device without using the device's alarm system.

2. Known Prior Art

Wireless network access devices, such as cellular telephones, mobile facsimile machines and wireless personal assistants, are fast becoming essential business tools appearing everywhere carried by rushed executives needing need to be constantly available. In fact, the very mobility of these devices creates new problems for their users. For example, the annoying sound of a cellular telephone or pager ringing in normally quiet restaurants, concert halls and theaters has led some establishments to ban cellular telephones and pagers from their premises or to require the owners to at least turn the devices off under threat of ejection.

At the other end of the spectrum is the problem where the user has walked a short distance away from the cellular telephone or pager and has missed an incoming call because the device's warning alarm was not loud enough to be heard.

In both of these situations the very mobility of the devices creates problems tending to limit their usefulness and restrict their owners from enjoying the full freedom and mobility the devices promise.

While important embodiment of the invention will be discussed as applied to cellular telephones, wireless network access devices are not restricted to cellular telephones, but also include other access devices for wireless systems, such as the cellular system connecting pagers, modems, facsimile machines and the like, as well as wireless devices operating on the Personal Communications System (PCS), Personal Communications Net (PCN), Global Speciale Mobile (GSM), Specialized Mobile Radio (SMR), Extended Specialized Mobile Radio (ESMR), and other wireless systems.

Using cellular telephones, as an example, as a result of the general disapproval and embarrassment of hearing a cellular telephone ringing in normally quiet areas or at inappropriate times, cellular telephone manufacturers have begun adding to their units non-audible alarms in the form of vibrators and lights to provide their users with a choice between an audible or a silent alarm signaling an incoming call. Some even offer an antenna with a light indicator, such as a LED, that flashes to indicate incoming calls as a visual alarm.

No solution to amplify the alarm of a wireless network access device without modification of the internal circuitry of the device, other than that disclosed in the pending patent applications cited below, is known to Applicants.

Pending patent applications Ser. Nos. 08/400340 filed Mar. 8, 1995 and 08/437,173 filed May 8, 1995, disclose circuitry and methods for detecting incoming calls to a wireless network access device with an externally activated circuit that provides both audible and non-audible alarm systems.

OBJECTIVES AND SUMMARY OF THE INVENTION

It is therefore an object of the present invention to provide an accessory for a wireless network access device that provides the user with a choice of an audible or a silent alarm to indicate incoming calls.

It is a further object of the present invention to provide an accessory for a wireless network access device, such as a cellular telephone, that is easily installed and does not require modification of the internal operation of the device.

In general, while the pending applications have already disclosed circuitry and methods for detecting incoming calls by monitoring the power consumption characteristics of the device during operation, the present invention provides additional monitoring circuitry to confirm an incoming call in situations where monitoring the power consumption characteristics of the device during operation may not suffice to give foolproof results.

The present invention then, is embodied in a monitoring circuit, external to the device being monitored, that operates without modifying the internal operation of the monitored device.

One main problem overcome by the present invention is that the only external connections available for interfacing with many wireless network access devices, is the power supplied to the device or the connection to the device's peripheral input/output connector. Any signals that normally indicate incoming calls are available only inside the unit, and not to any electronic circuitry located outside the unit itself.

This limitation requires that the invention detect the incoming call by externally detectible operating characteristics of the device, such as the power drawn and the operational status of the device's transmitter when an incoming call is present. The present invention monitors both the power supplied to the unit and the radio frequency output of the device's transmitter to determine the status of the device's transmitter as being active ("on") or inactive ("off").

Further, the detection scheme of the present invention is capable of discriminating between originating a call and answering a call.

The present invention is also embodied in a method to discriminate between incoming and outgoing calls by monitoring power drain and power surge characteristics in conjunction with radio frequency transmissions from the unit's transmitter to determine the operational status of the unit.

Cellular telephone units also have transitory registration signals that are not incoming call signals, but require the unit to draw power to transmit as if an incoming call were present. The present invention further includes a method to discriminate between auto-registration operating functions of the unit and incoming call signals by monitoring the external power drain and surge characteristics of the unit in conjunction with the radio frequency transmissions from the unit's transmitter to determine the operational status of the unit.

The preferred embodiment of the invention described below is detailed for a cellular telephone, but applies equally to any wireless network access device having a transmitter and exhibiting similar operating characteristics. The preferred embodiment of the invention includes a monitoring circuit built into a removable battery pack that makes no changes to the standard battery pack exterior casing. Many times where the battery pack exterior casing is kept intact, there is no room for an on/off switch and the call detection circuitry of the preferred embodiment discussed will be continuously on even when the unit is not in use, i.e., off. Thus, the present invention must draw very small amounts of power to avoid draining the battery prematurely. The circuit preferably detects when the low voltage (1 volt per cell) limit of the battery is reached, and then stops drawing power from the cells, for continuing to draw power from the battery below this limit may cause damage to the battery pack cells.

In summary then, the present invention is embodied in monitoring circuitry for wireless network access devices, such as cellular telephones, that indicates incoming calls by monitoring the electrical current used to power the device in conjunction with the operational status of the device's transmitter. Preferably inside the device's battery pack, is circuitry including: a current to voltage conversion circuit that generates an AC voltage signal having a value representative of the current being drawn by operation of the device; a status determination circuit that receives and monitors the voltage signal and generates a waiting for call state signal whenever the value of the voltage signal decreases from a first selected higher value to a first selected lower value for a first preselected period of time; RF monitoring circuitry for detecting RF transmissions by the device transmitter and generating a transmitter active status signal whenever RF transmissions are detected for a preselected period of time; an incoming call detection circuit that receives the waiting for call state and transmitter active status signals, and monitors the voltage signal to generate an alarm start signal whenever the waiting for call state and transmitter active status signals are present and the monitored voltage signal increases from a second selected lower value to a second selected higher value and remains at or above the second selected higher value for a second preselected period of time. An alarm circuit such as a vibrator, a flashing light, or an amplified audible alarm, that operates upon receipt of the alarm start signal, may be added for indicating an incoming call to a user.

The invention is also embodied in additional circuitry such as a DC transient monitoring circuit for monitoring the current being drawn by the operation of the device, and generating the alarm start signal whenever both the waiting for call state and transmitter active status signals are present and the current being drawn by the device increases from a lower preselected current value to a higher preselected current value and remains at or above the higher current value for a third preselected period of time.

Additional embodiments of the present invention include a voltage level monitoring circuit acting as a cutoff for monitoring the voltage signal from the power source and disabling the device, such as by preventing the generation of the waiting for call state or transmitter active status signals by the status determination circuitry, thereby disabling the remainder of the circuits from further operation, whenever the value of the voltage signal drops below a preselected cutoff value.

A preferred method embodying the present invention includes the steps of:

(a) generating a voltage signal having a value representative of the current being drawn by the operation of the device;

(b) generating a waiting for call state signal whenever the value of the voltage signal decreases from a first selected higher value to a first selected lower value for a first preselected period of time;

(c) monitoring the RF transmissions by the device's transmitter, and generating a transmitter active status signal whenever RF transmissions by the device's transmitter are detected for a preselected period of time;

(d) generating an alarm start signal whenever the waiting for call state and transmitter active status signals are present and the voltage signal (reflecting changes in the current signal) increases from a second selected lower value to a second selected higher value and remains at or above the second selected higher value for a second preselected period of time.

This method may also include as an additional step:

(d) generating an alarm signal perceptible by a user upon receipt of the alarm start signal for indicating an incoming call.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

A preferred embodiment and operation of the invention is now described with reference to the accompanying drawings in FIGS. 1 to 4.

Cellular telephones generally have three operating states:

1. "Standby" or "Sleep" mode: In this mode unit displays are normally "off", DC current drain from the battery is low to prevent unnecessary battery drainage, and the unit's transmitter is inactive. This mode is sometimes known as a "battery saver mode".

2. "Display mode": In this mode most of the unit displays are enabled, e.g., signal strength, battery strength, etc. DC current drain from the battery is low, but some transient pulses and ripples are present in the unit's circuitry. The unit's transmitter is inactive.

3. "Active mode": In this mode, the transmitter/receiver circuitry is in use, i.e., RF transmissions are made to connect the unit to the cellular system, the DC current drain from the battery is high. The unit goes into the active mode when either the "send" button is pressed, or upon detection of an incoming call to the unit.

Note that while the terms "low" and "high" with regard to the DC current appearing in the individual unit, are relative terms, they normally fall into a fairly regular band of detectible current values.

Figure 1A:
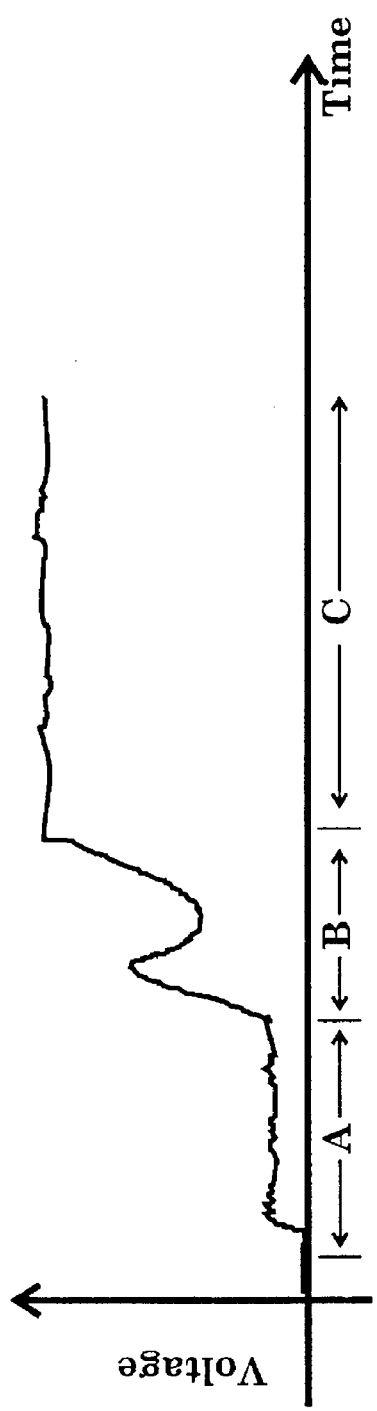
FIG. 1A is graph showing voltage transients appearing on the power line for a cellular telephone over time as the cellular telephone responds to an incoming call.
Figure 1B:
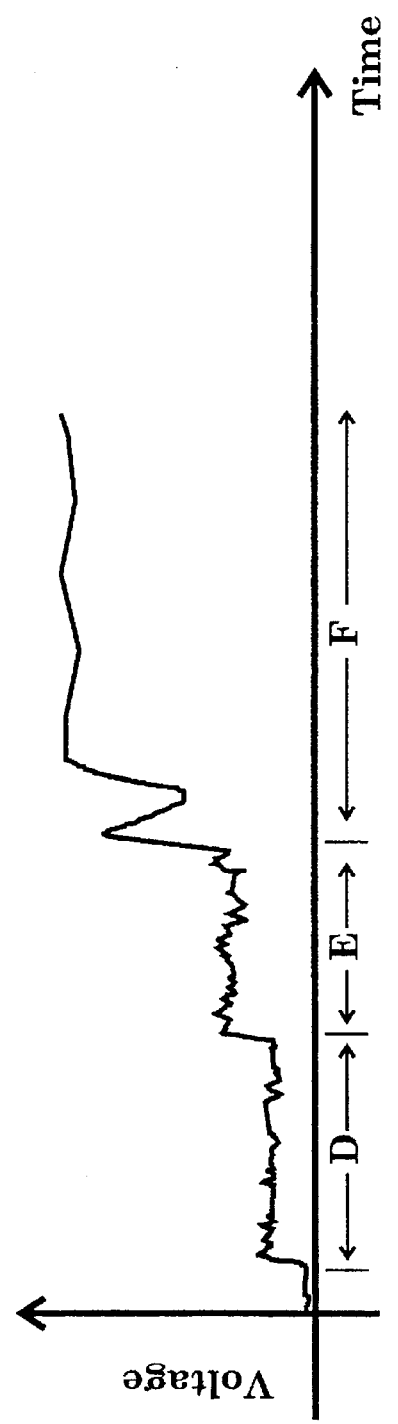
FIG. 1B is graph showing voltage transients appearing on the power line for a cellular telephone over time as the cellular telephone originates an outgoing call.

When the unit is turned on, the current draw at the battery pack rises with periodic current transients as shown at A and D in FIGS. 1A and 1B, respectively. This is indicative of the standby mode, i.e., when the unit is ON and ready to receive an incoming call, but no further activity has occurred by the user.

When the user touches any of the buttons on the unit, or in the case of some units, when the mouthpiece cover or flip portion of the case has been opened, the unit then goes into the display mode. For example, if the user opens the flip cover of the unit and attempts to dial digits, the change at E in FIG. 1B occurs to the power current signal. The general current drain increases from that shown at D in FIG. 1B with the larger transients being caused by the now active LCD display. If no user activity follows, the general current drain will revert to a lower level state similar to that shown at D in FIG. 1B.

Figure 1C:
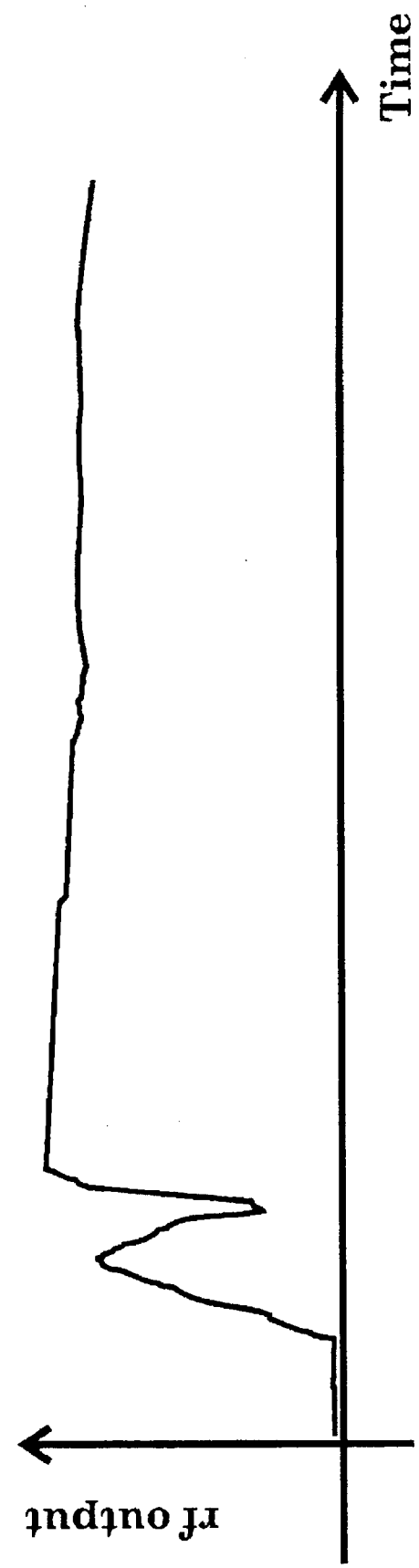
FIG. 1C is a graph showing RF transmissions for a cellular telephone transmitter over time as the cellular telephone responds to an incoming call.

If an auto-registration or incoming call page alert signal occurs, the unit's transmitter responds with a large current level change as shown at B in FIG. 1A. If the call setup continues, the cell site assigns the unit an RF channel to operate on, and the unit's transmitter momentarily switches OFF then turns ON again and remains active on the RF channel selected as shown in FIG. 1C with a corresponding power drain as shown at C in FIG. 1A. The call is ready to be answered by the user and the telephone would normally ring, indicating an incoming call. Now it is appropriate to operate an alarm to indicate the incoming call to the user.

If the user originates a call, the signal characteristics are very similar to that discussed above for answering a call with the channel assignment process being identical. Therefore, the problem in this situation is to detect differences between the two similar signal patterns. When the user attempts to originate a call, he must first enter the number to be called. This activity causes large pulse transients as shown at E in FIG. 1B. Detection of the transients as shown at E in FIG. 1B in the power drain, constitutes an event that must occur before an event as shown at C in FIG. 1A or as at F in FIG. 1B can occur due to the device's transmitter becoming active.

This event sequence allows for the discrimination of incoming versus outgoing calls on the unit.

Figure 2:
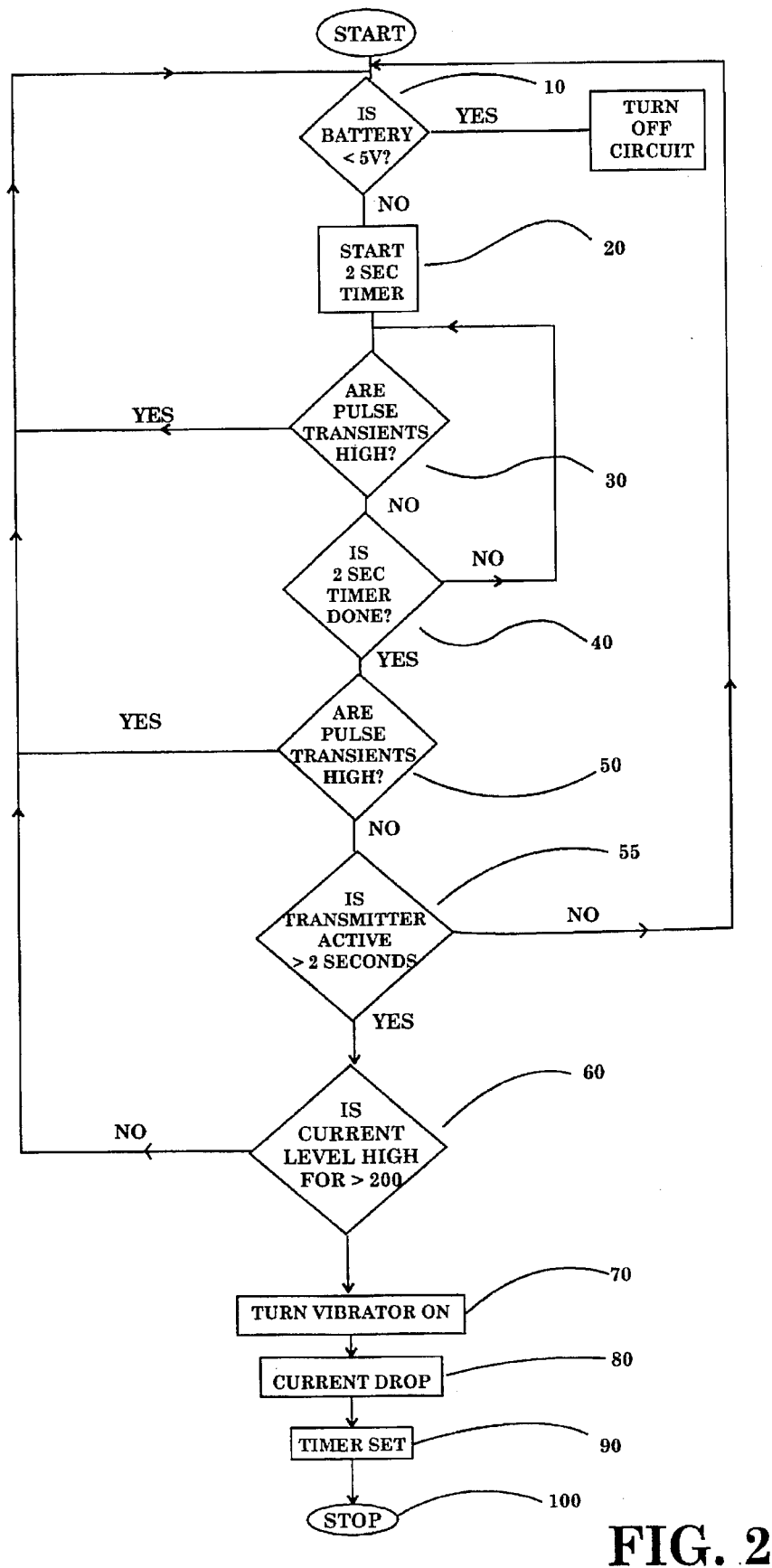
FIG. 2 is an idealized flow chart showing the logic flow of a device embodying the present invention.

FIG. 2 is a flow chart showing the operation of a circuit embodying the present invention. At 10, the battery pack voltage is tested continuously to ensure the battery voltage does not drop below 1 volt per cell. If the call detection circuits continue to draw power from the battery cell below 1 volt per cell, this can cause irreparable damage to the battery cells. If the battery pack voltage does drop below this minimum value, the call detect circuitry is automatically disabled and no longer draws power from the battery pack.

If the unit is ON, a timer is started (for example, a preset 2 or so second timer) as shown at 20. If no high pulse transients occur during the timed period as shown at 30, this indicates that the unit is ON and not being used, but is instead waiting for an incoming call.

If the timer completes at 40, with no high pulse transients having occurred, then the call detection scheme switches to the next state to await an incoming call. If a high transient occurs at either 30 or 50, then the user is attempting to originate a call, and the telephone is no longer idle waiting for an incoming call.

If as shown at 55 an RF transmission from the unit's transmitter is detected for longer than a preselected period of time, the transmitter is in the active or on state and is engaged in a pre-call set-up exchange of information with the calling cell site, i.e., an incoming call is more than likely imminent or in process.

If a high current level change occurs now at 60, for more than a fixed period of time, for example, about 200 mS, then an incoming call setup has occurred and the alarm or vibrator is turned on at 70. The vibrator is timed at 70 and if the current level drops, as shown at 80, this indicates that the incoming call was terminated and the alarm or vibrator stops immediately. Otherwise, the alarm or vibrator will operate for the alarm timer duration 90 and then stop 100.

Figure 3:
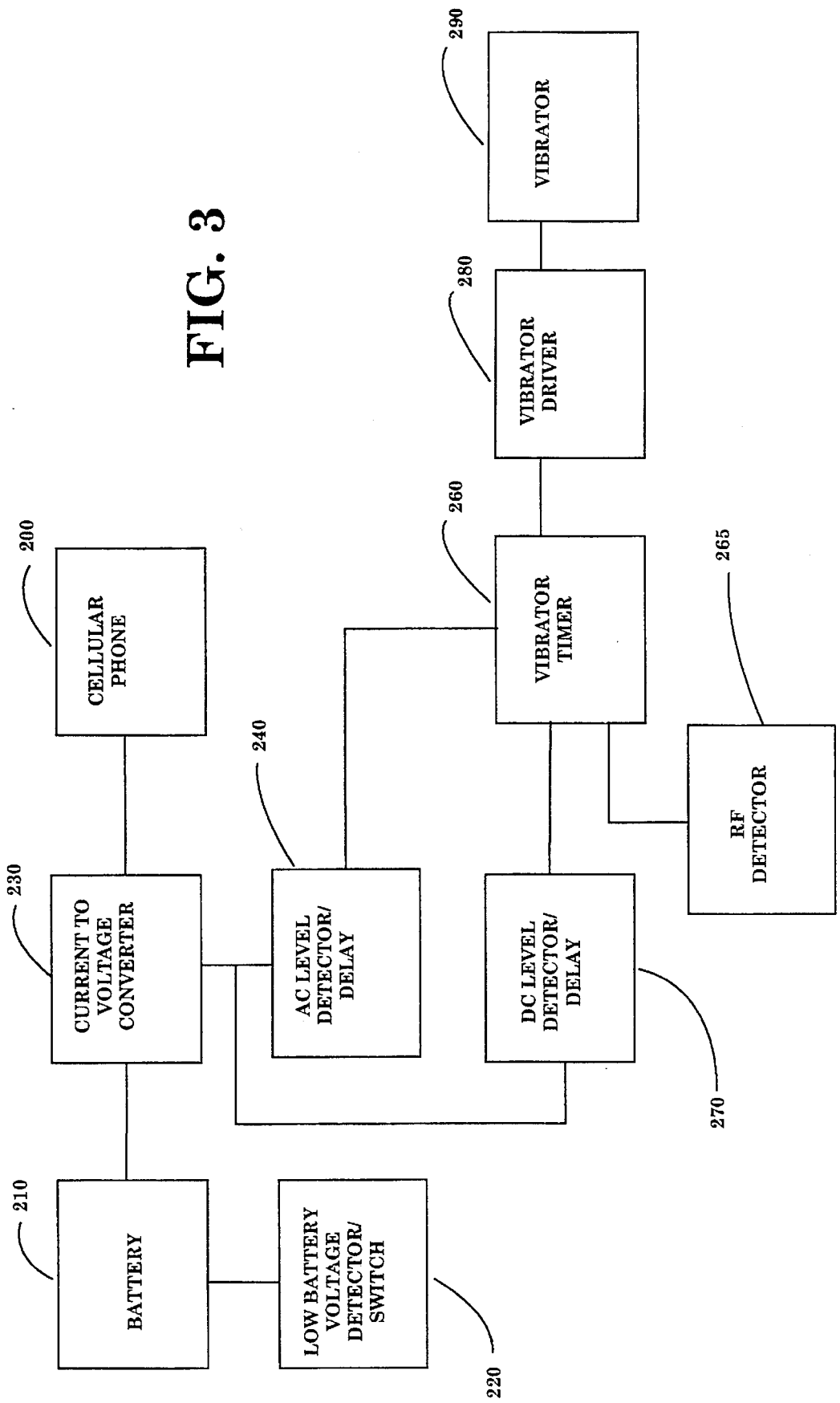
FIG. 3 is an idealized block diagram showing the various operating components that would be found in a preferred embodiment of the present invention; and, FIG. 4 is a schematic diagram of a circuit that embodies the present invention.

FIG. 3 is an idealized block diagram showing the various operating components found in a preferred embodiment of the present invention.

In FIG. 3, cellular telephone 200 is connected to battery pack 210 in the normally accepted industry manner of attachment to the cellular telephone case and mating with externally provided contacts.

Low battery voltage detector circuitry 220 acts as a switch controlling the operation of the incoming call detection and alarm circuitry to prevent harm from occurring to the battery 210 due to the detection and alarm circuitry continuing to draw power from the battery below a certain critical level.

An DC to AC conversion circuit 230 is operatively coupled to the current signal generated by battery 210 and generates as an output a voltage signal having a value representative of the current being drawn by operation of the cellular telephone. This is preferred as being an effective manner in which to detect changes in the power demand being made on battery 210 by the operation of the cellular telephone.

Other methods useful in monitoring the unit's current draw on the power source include circuitry providing for the inductive sensing of the power being drawn from the source of electrical power by operation of the unit. One such circuit includes a transformer inductively coupled to the power source by having its primary winding (about 5 or so turns) coupled to the power lead from the power source, and its secondary winding (about 1000 turns) used to detect the varying current demands being made upon the battery or power source by the unit during operation.

Other circuits detect changes in the magnetic field surrounding the power source caused by operation of the cellular telephone. An example of such circuitry includes a circuit having a Hall effect transistor coupled to the power source.

A first circuit 240 determines the status of cellular telephone 200 by receiving and monitoring the voltage signal output of conversion circuitry 230 for AC transients appearing in the voltage signal. Circuitry 240 generates as an output a waiting for call state signal whenever the value of the voltage signal decreases from a first selected higher value to a first selected lower value for a first preselected period of time. Circuit 240 is useful to indicate the state of various components of cellular telephone 200 such as an LCD display which draws a characteristic amount of power and has various characteristic AC transients associated with its operation.

Vibrator timer circuitry 260 determines when the incoming call is connected, and turns the vibrator off as described more fully below.

Incoming call detection is provided for by DC transient detection circuitry 270 acting in cooperation with AC transient detection circuitry 240, RF detection circuitry 250, and timer circuit 260.

DC transient detection circuitry 270 monitors both the voltage signal and current, and generates an alarm start signal whenever the waiting for call state signal is present and the voltage signal increases from a second selected lower value to a second selected higher value and remains at or above the second selected higher value for a second preselected period of time, or whenever the waiting for call state signal is present and the current goes from a lower preselected current value to a higher preselected current value and remains at or above the higher current value for a third preselected period of time.

Circuitry 240 and 270 also preferably include delay circuitry to insure that false signals do not inadvertently trigger the alarm circuitry.

A circuit 265 monitors the device's transmitter for radio frequency transmissions. Once a RF transmission is detected, a timer circuit is enabled to determine if the transmission is a transient or an actual activation of the device transmitter. If the timer successfully completes its timing function and the RF transmissions continue, it is assumed that the unit's transmitter has become active preparatory to reception of an incoming call to the unit.

Important considerations in constructing the RF monitoring circuit are that the receiver portion of the monitoring circuit must be very insensitive to outside RF sources to prevent false triggering signals. For example, a microwave oven, or a nearby cellular telephone receiving or making a call must be discriminated against by the insensitivity of the circuit. It is preferred that the sensing element of the RF monitoring circuit be juxtaposed the transmitting antenna of the unit's transmitter allowing for a simple and insensitive monitoring circuit.

An alarm circuit, such as vibrator driver 280 and vibrator 290, is operative upon receipt of the alarm start signal from DC transient detector circuitry 270 to provide a sensory signal for indicating an incoming call to the user.

A processor, such as a microprocessor, with an Analog/digital input can be used to monitor current to voltage and RF detector circuits outputs and make all decisions regarding display and RF transmitter status. The microprocessor can be used to do all timer functions and drive the vibrator/alarm circuits as well.

Figure 4:
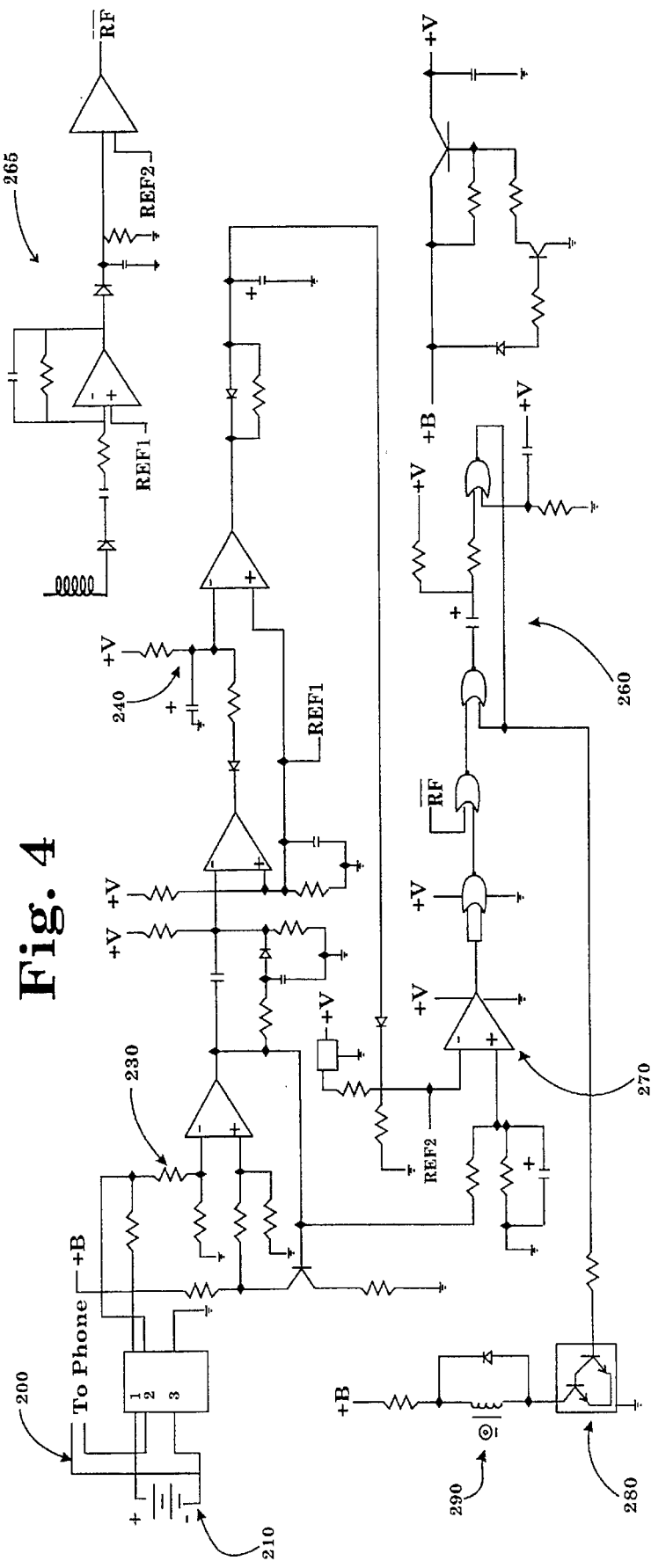

FIG. 4 is a schematic diagram of a circuit that embodies the various block components of present invention as just described where the reference arrows and numerals shown correspond to those described above for the block components of FIG. 3.

The present invention is also found in a preferred method for indicating an incoming telephone call on a wireless network access device, such as a cellular telephone, to a user that embodies the present invention by including the steps of:

(a) generating a voltage signal having a value representative of the current being drawn by the operation of the cellular telephone;

(b) generating a waiting for call state signal whenever the value of the voltage signal decreases from a first selected higher value to a first selected lower value for a first preselected period of time;

(c) monitoring the RF transmissions by the device transmitter, and generating a transmitter active status signal whenever RF transmission by the device transmitter is detected for a preselected period of time;

(d) generating an alarm start signal whenever said waiting for call state signal and said transmitter active signal are both present and the voltage signal increases from a second selected lower value to a second selected higher value and remains at or above the second selected higher value for a second preselected period of time; and, (e) generating an alarm signal perceptible by a user upon receipt of the alarm start signal for indicating an incoming call. Examples of this include providing a vibratory sensory signal to the user indicating an incoming call on the cellular telephone.

The preferred method embodying the present invention may also include for the step of generating a waiting for call state signal whenever the value of the voltage signal decreases from a first selected higher value to a first selected lower value for a first preselected period of time further an additional step of:

(e) generating the alarm start signal whenever the waiting for call state signal is present and the current goes from a lower preselected current value to a higher preselected current value and remains at or above the higher current value for a third preselected period of time.

Additional steps include adding to the preferred embodiment the step of:

(f) disabling the status determination circuitry from further operation whenever the value of the voltage signal drops below a preselected cutoff value.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An apparatus, monitoring both the electrical power demands made by operation of a wireless network access device on an electrical power source, and the RF transmissions from a device transmitter, for indicating an incoming call to a user, comprising:

power monitoring means operatively coupled to the electrical power source for providing a power source state signal representative of the current being drawn by operation of the device from the power source;

means, operative upon receipt of said power source state signal, for generating a power source voltage state signal having a value representative of the current being drawn by operation of the device from the power source;

device status determination means for receiving and monitoring said power source voltage state signal and for generating a waiting for call state signal whenever the value of said power source voltage state signal decreases from a first selected higher value to a first selected lower value for a first preselected period of time;

RF monitoring means for detecting RF transmissions by the device transmitter, and for generating a transmitter active status signal whenever RF transmission by the device transmitter is detected for a second preselected period of time;

incoming call detection means for receiving said waiting for call state signal and monitoring said transmitter active status signal, and for generating an alarm start signal whenever said waiting for a call state signal and said transmitter active status signals are both present.

2. The apparatus of claim 1 further comprising:

alarm means operative upon receipt of said alarm start signal for indicating an incoming call to a user.

3. The apparatus of claim 1 further comprising:

cutoff means for monitoring said power source voltage and disabling said apparatus from further operation whenever the power source voltage drops below a preselected cutoff value.

4. The apparatus of claim 3 wherein said cutoff means further comprises:

cutoff means for monitoring said power source voltage state signal and disabling said apparatus from further operation whenever the value of said power source voltage state signal drops below a preselected cutoff value.

5. The apparatus as in claim 2 wherein said alarm means further comprises:

a vibrator for providing a sensory signal to the user indicating an incoming call on the device.

6. The apparatus as in claim 2 wherein said alarm means further comprises:

a light for providing a visual signal to the user indicating an incoming call on the device.

7. The apparatus as in claim 2 wherein said alarm means further comprises:

audible sound generation means for providing an audible signal to the user indicating an incoming call on the device.

8. An apparatus as in claim 1 wherein said power monitoring means comprises:

means for inductive sensing of the current being drawn from the electrical power source by operation of the device.

9. An apparatus as in claim 8 wherein said inductive sensing means comprises:

transformer means inductively coupled to the electrical power source.

10. An apparatus as in claim 1 wherein said power monitoring means comprises:

means for detecting changes in the magnetic field surrounding the electrical power source caused by operation of the device.

11. An apparatus as in claim 10 wherein said magnetic sensing means comprises:

circuit means including a Hall effect transistor coupled to the electrical power source.

12. An apparatus, monitoring both the electrical power demands made by operation of a wireless network access device on an electrical power source, and the RF transmissions from a device transmitter, for indicating an incoming call to a user comprising:

power monitoring means operatively coupled to the electrical power source for providing a power source state signal representative of the current being drawn by operation of the device from the power source;

means, operative upon receipt of said power source state signal, for generating a power source voltage state signal having a value representative of the current being drawn by operation of the device from the power source;

device status determination means for receiving and monitoring said power source voltage state signal and for generating a waiting for call state signal whenever the value of said power source voltage state signal decreases from a first selected higher value to a first selected lower value for a first preselected period of time;

RF monitoring means for detecting RF transmissions by the device transmitter, and for generating a transmitter active status signal whenever RF transmission by the device transmitter is detected for a second preselected period of time;

incoming call detection means for receiving said waiting for call state signal and said transmitter active status signal, and monitoring said power source voltage state signal, and for generating an alarm start signal whenever said waiting for call state signal is present and, (1) said power source voltage state signal increases from a second selected lower value to a second selected higher value and remains at or above said second selected higher value for a second preselected period of time, or, (2) said transmitter active status signal is present.

13. The apparatus as in claim 12 further comprising:

alarm means operative upon receipt of said alarm start signal for indicating an incoming call to a user.

14. The apparatus as in claim 12 wherein said incoming call detection means further comprises:

means for monitoring said power source state signal and generating said alarm start signal whenever said waiting for call state signal is present and said power source state signal goes from a lower preselected current value to a higher preselected current value and remains at or above said higher current value for a third preselected period of time.

15. The apparatus as in claim 12 further comprising:

cutoff means for monitoring said power source voltage state signal and disabling said status determination means from further operation whenever the value of said power source voltage state signal drops below a preselected cutoff value.

16. The apparatus as in claim 12 wherein said alarm means further comprises:

a vibrator for providing a sensory signal to the user indicating an incoming call on the device.

17. The apparatus as in claim 12 wherein said alarm means further comprises:

a light for providing a visual signal to the user indicating an incoming call on the device.

18. The apparatus as in claim 12 wherein said alarm means further comprises:

audible sound generation means for providing an audible signal to the user indicating an incoming call on the device.

19. An apparatus as in claim 12 wherein said monitoring means comprises:

means for inductive sensing of the current being drawn from the power source by operation of the device.

20. An apparatus as in claim 19 wherein said inductive sensing means comprises:

transformer means inductively coupled to the power source.

21. An apparatus as in claim 12 wherein said monitoring means comprises:

means for detecting changes in the magnetic field surrounding the power source caused by operation of the device.

22. An apparatus as in claim 21 wherein said magnetic sensing means comprises:

circuit means including a Hall effect transistor coupled to the power source.

23. An method for monitoring the electrical power demands made by operation of a wireless network access device on a source of electrical power, and the RF transmissions from a device transmitter, for indicating an incoming call to a user comprising:

monitoring the electrical current being drawn by operation of the device from the power source and generating a power source state signal representative of the current being drawn by operation of the device;

receiving said power source state signal and generating, based thereon, a power source voltage state signal having a value representative of the current being drawn by operation of the device from the power source;

generating a waiting for call state signal whenever the value of said power source voltage state signal decreases from a first selected higher value to a first selected lower value for a first preselected period of time;

monitoring the RF transmissions by the device transmitter, and generating a transmitter active status signal whenever RF transmission by the device transmitter is detected for a preselected period of time;

generating an alarm start signal whenever said waiting for call state signal and said transmitter active signal are both present.

24. The method of claim 23 wherein said step of generating an alarm start signal further includes:

generating said alarm start signal whenever said waiting for call state signal and said transmitter active status signals are both present and said power source voltage state signal increases from a second selected lower value to a second selected higher value and remains at or above said second selected higher value for a second preselected period of time.

25. The method of claim 23 further including the step of:

generating an alarm signal perceptible by a user upon receipt of said alarm start signal for indicating an incoming call.

26. The method of claim 23 wherein said step of generating a waiting for call state signal whenever the value of said power source voltage state signal decreases from a first selected higher value to a first selected lower value for a first preselected period of time further comprises the step of:

generating said alarm start signal whenever said waiting for call state signal is present and said power source state signal goes from a lower preselected current value to a higher preselected current value and remains at or above said higher current value for a third preselected period of time.

27. The method as in claim 24 further comprising the step of:

disabling said device status determination means from further operation whenever the value of said power source voltage state signal drops below a preselected cutoff value.

28. The method as in claim 24 wherein said step of generating an alarm signal perceptible by a user upon receipt of said alarm start signal for indicating an incoming call further comprises the step of:

providing a vibratory sensory signal to the user indicating an incoming call on the device.

29. The method as in claim 24 wherein said step of generating an alarm signal perceptible by a user upon receipt of said alarm start signal for indicating an incoming call further comprises the step of:

providing a visual sensory signal to the user indicating an incoming call on the device.

* * * * *